Jan. 1, 1963  K. GEBELE  3,071,056
PHOTOGRAPHIC CAMERA
Filed Sept. 25, 1958  2 Sheets-Sheet 1

Jan. 1, 1963 K. GEBELE 3,071,056
PHOTOGRAPHIC CAMERA
Filed Sept. 25, 1958 2 Sheets-Sheet 2

United States Patent Office 3,071,056
Patented Jan. 1, 1963

3,071,056
PHOTOGRAPHIC CAMERA
Kurt Gebele, Munich, Germany, assignor to Compur-Werk Friedrich Deckel oHG., Munich, Germany, a firm of Germany
Filed Sept. 25, 1958, Ser. No. 763,304
Claims priority, application Germany Sept. 30, 1957
4 Claims. (Cl. 95—64)

The present invention relates to a photographic camera and, more particularly, to such a camera equipped for flash photography.

An object of the invention is the provision of a generally improved and more satisfactory camera structure for use in flash photography.

Another object is the provision of a camera having an adjustable diaphragm or stop, and having improved scale means of simple character to facilitate the setting of the diaphragm or stop with relation to the shutter speed when taking flashlight pictures.

Yet another object is the provision, in a photographic camera, of simplified and improved scale means for setting the diaphragm aperture adjusting member in accordance with the distance from the flash apparatus to the main subject being photographed, and also in accordance with the so-called "guide number" of the flash equipment.

A further object is to provide a new and improved photographic camera for use in flashlight photography having a diaphragm setting member which is simple and conveniently adjusted in accordance with the indications of an indicating device and with respect to an indication of the shutter speed to adjust the aperture adjusting mechanism to an aperture corresponding to the distance set, thus doing away with all mental calculations.

A still further object is the provision of a new and improved photographic camera for flashlight photography having an adjustable diaphragm or stop, and having improved scales of simple character to facilitate the setting of the diaphragm in accordance with the distance from the flash apparatus to the main subject being photographed, and also in accordance with the so-called "guide number" of the flash equipment, wherein the diaphragm is also set in accordance with the exposure time setting so that an inexperienced operator is prevented from taking poor pictures which might result from having selected an exposure time which is unsuitable for the flash photograph.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
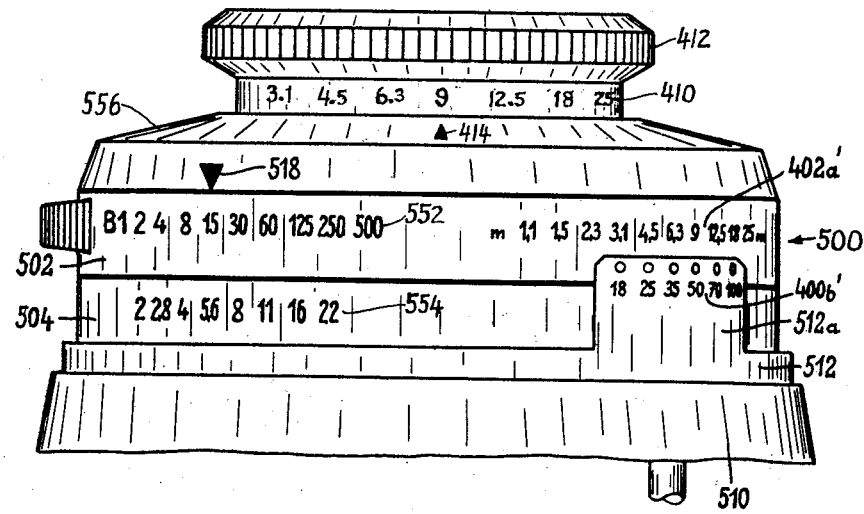
FIG. 1 is a top view of a portion of a camera, and in particular its shutter, constructed in accordance with the invention.

With the increasing popularity of flashlight photography, problems arise more frequently than in the past, in setting the camera for proper exposure under flash conditions. Where a picture is taken by flash, it is customary to use a so-called guide number as an aid in setting the diaphragm aperture adjustment. The guide number varies according to the type or kind of flash bulb or electronic flash employed, the character of the reflector used with the camera, and also according to the speed rating or sensitivity rating of the particular film employed in the camera. The guide number depends also to some extent on the shutter speed, if the shutter speed is a limiting factor in any particular exposure, but whenever the shutter speed is set slow enough so that the duration of the exposure is determined by the duration of the flash rather than by the time that the shutter blades are open, then the guide number is substantially independent of shutter speed, and this is true in the case of most flash photographs. The guide number, whatever it may be, expresses a product relationship or reciprocal relationship between the diaphragm aperture (expressed as $f$ number) and the distance between the flash apparatus to the subject being illuminated by the flash lamp, expressed in suitable units of distance such as feet or meters. In most cases, the flash apparatus is mounted on the camera, so that the distance from the flash apparatus to the subject is the same as the distance from the camera to the subject, and is the same distance used in focusing the lens of the camera.

Thus, for example, if one is using guide numbers designed for distances expressed in feet, and finds that the guide number under prevailing conditions is 80, this means that if the principal object which is to appear in the photograph is at a distance of 10 feet from the flash apparatus, the diaphragm aperture of the camera should be set at $f:8$, or if the subject is at a distance of 5 feet, the diaphragm aperture should be stopped down to $f:16$. Similarly, if one is using guide numbers designed for distances expressed in meters rather than in feet, and if the guide number is, say, 24, then if the object is at a distance of 3 meters, the diaphragm aperture should be set at $f:8$, or if at a distance of 1.5 meters, the aperture should be set at $f:16$, and so on.

This requires considerable mental calculation, particularly when either the guide number or the distance is such that the distance does not divide evenly into the guide number and thus the answer cannot be obtained easily and quickly by a simple mental operation.

According to the present invention, special supplementary scales are provided for setting the diaphragm aperture adjustment in accordance with the distance to the principal subject and in accordance with the guide number, thus obviating the need (at least when taking flash photographs) for determining the proper aperture and then setting the diaphragm in accordance with the $f$ number of the aperture. The supplementary scales of the present invention make flashlight photography particularly simple and easy for the inexperienced as well as the experienced photographer.

Figure 2:
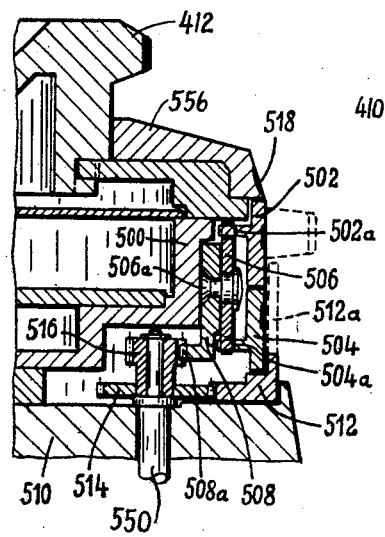
FIG. 2 is a fragmentary cross sectional view of the shutter illustrated in FIG. 1.

In the embodiment illustrated in FIGS. 1 and 2, a between-lens shutter 500 is disclosed having a built-in diaphragm device in connection with which the setting members for shutter speed and diaphragm aperture are arranged around the between-lens shutter coaxial to the optical axis. A shutter of this type is described and illustrated in detail in the copending patent application to K. Gebele and F. Singer, Serial No. 707,796, filed January 8, 1958 (now Patent 2,990,761, granted July 4, 1961). Reference should be made to this patent application for a disclosure of the complete structure and mode of operation, since only that structure and operation which is essential to the understanding of the present invention will be here described. The shutter speed setting ring 502 is connected with the shutter speed control ring (not here shown) on the shutter, while the diaphragm setting ring 504 is in engagement with the diaphragm control ring (also not here shown) in the shutter. The two setting rings each bear sun toothings 502a and 504a, respectively, which engage opposite sides of a planet gear 506, the plane of which is parallel to the optical axis. The planet gear 506 is rotatable on a pin 506a carried by a control ring 508, which is also coaxial to the optical axis. The setting ring 502 for the shutter speed and the setting ring 504 for the diaphragm aperture are therefore coupled with each other by a gear differential. Briefly, the control ring 508 is rotated in accordance with an exposure value meter follow-up device, whereupon the setting rings 502 and 504 are automatically rotated by different amounts to set the correct diaphragm aperture and shutter speed for the exposure value indicated on the meter. On the other hand, the selection of a different pair of shutter speed and diaphragm aperture values may be made while keeping a constant exposure value by adjusting the shutter speed setting ring 502.

In order to be able to use this setting arrangement coupled as described for daylight photographs also for the indication of guide numbers for flashlight photographs, a scale ring 512 is supported rotatably on a mount 510 provided on the camera side, the ring 512 extending between the mount 510 and the shutter 500. The scale ring 512 is generally L-shaped in cross section, and the inner edge of the inwardly extending leg of the scale ring is provided with a toothing for engaging a pinion 514 fixed to a shaft 550 rotatably supported by the mount 510. A second pinion 516 is rigidly connected to the pinion 514 coaxially therewith although spaced therefrom. The second pinion 516 engages with a toothing 508a on an inwardly extending portion of the control ring 508. The pinions 514 and 516 preferably have a two to one ratio. Thus, the scale ring 512 is turned in the same direction as the control ring 508 and with double the angular speed of the control ring 508.

The scale ring 512 has on a portion of its outer periphery an arcuate extension 512a on which a circumferentially graduated guide number scale 400b' is arranged. The guide number scale 400b' is arranged approximately opposite an auxiliary range or distance scale 402a', carried by the shutter speed setting ring 502. As shown, the scale 402a' is graduated circumferentially about the ring 502 and is expressed in meters, although it is to be understood, of course, that any suitable distance units may be employed. The main focus distance scale 410 is on the focusing lens mount 412.

The spacing and arrangement of the scales 402a' and 400b' are determined by the spacing and arrangement of the shutter speed scale 552 carried by the ring 502 and the diaphragm aperture scale 554 carried by the ring 504. These scales are read in conjunction with a stationary mark 518 carried by a portion of the shutter housing 556. Because of this predetermined relative location of the auxiliary distance and guide number scales with respect to the shutter speed scale, there is no possibility of using an incorrect shutter speed.

In the operation of the embodiment according to FIGS. 1 and 2, the operator first adjusts the shutter speed setting ring 502 to the desired exposure time, for example 1/15 of a second. Let us assume further that the guide number to be employed is "50" and the distance is 9 meters. The operator turns an adjustment knob (not here shown) arranged on the camera body which rotates the shaft 550 to turn the control ring 508 so that the diaphragm aperture setting ring 504 is adjusted by means of the differential gearing with respect to the shutter speed setting ring 502. This action corresponds to the diaphragm adjusting action in the above mentioned application 707,796, wherein the rotation of the control ring 40 (corresponding functionally to the present control ring 508) serves to set the diaphragm aperture as therein explained. As the control ring 508 rotates, the scale ring 512 is also turned in the same direction although at a different rate of speed until the guide number 50 on the scale 400b' is opposite the 9 indication on the auxiliary distance scale 402a'. The diaphragm aperture corresponding to the guide number and the distance, namely 5.6 for this example, appears automatically opposite the stationary mark 518.

Figure 3:
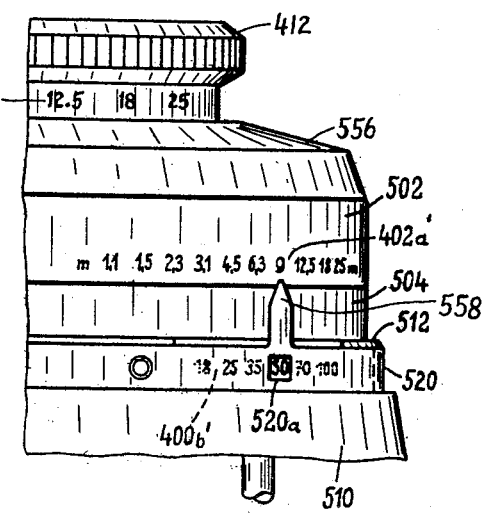
FIG. 3 is a fragmentary top view of a portion of a camera shutter similar to that shown in FIG. 1 constructed in accordance with a modification of the invention.

In the modification of FIG. 3, there is shown a variant of the construction of FIGS. 1 and 2, and corresponding numerals have been used to indicate corresponding parts and elements, no further description of which is thought to be necessary. In this modification, the unused values of the scale 400b' are covered by a covering ring 520 arranged radially outwardly of the scale ring 512. The rings 512 and 520 are coupled with each other by suitable detachable detent arrangement. The covering ring 520 has a window 520a through which the particular guide number to be used appears. The ring 520 also desirably has a pointer 558 alined with the window 520a so as to indicate the distance on the auxiliary distance scale 402a'.

The operation of the modification of FIG. 3 is substantially the same as that explained with regard to FIGS. 1 and 2. The covering ring 520 is adjusted relative to the scale ring 512 so that the selected guide number appears through the window 520a. Since the same guide number ordinarily is used for a series of photographs, this adjustment is simple and convenient and ordinarily need not be made too frequently.

Figure 4:
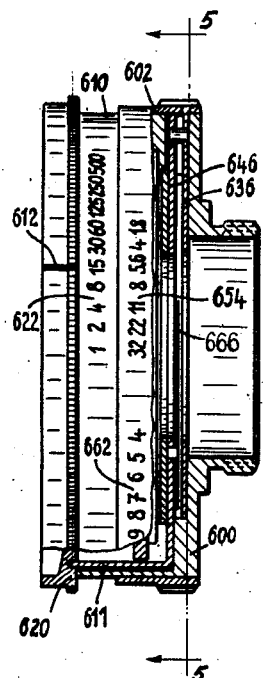
FIG. 4 is an edge view, partly in elevation and partly in diametrical axial section, illustrating a shutter of a camera in accordance with still another embodiment of the invention.
Figure 5:
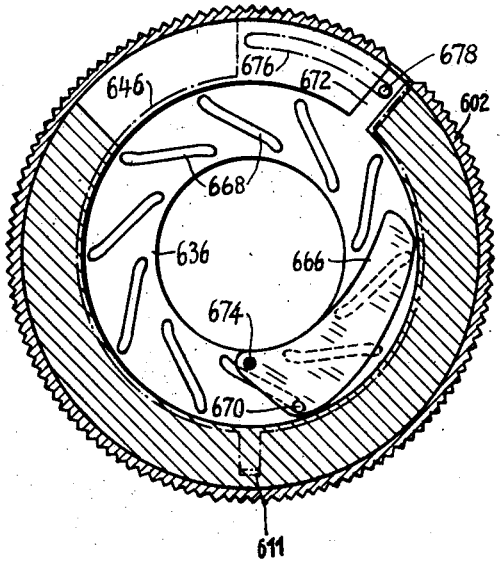
FIG. 5 is a transverse section taken substantially on the line 5—5 of FIG. 4.
Figure 6:
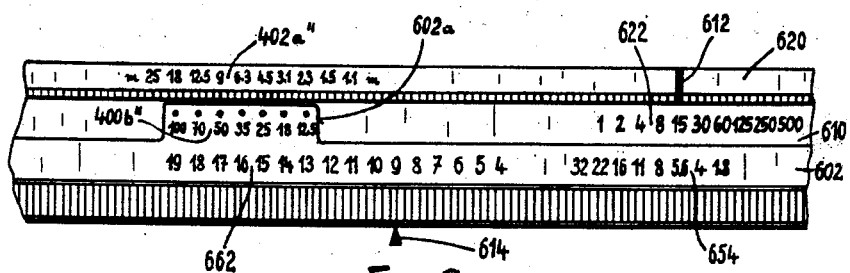
FIG. 6 is a developed view of the scales of the shutter shown in FIG. 4.

The modification of FIGS. 4 to 6 involves a between-lens shutter with a built-in diaphragm device having two diaphragm aperture setting rings, the first of which can be coupled with the shutter speed setting ring, while the second is adjustable taking into consideration the exposure value selected. A shutter of this type is explained and disclosed in detail in the copending patent application to C. Fahl, Serial No. 539,896, filed October 11, 1955 (now Patent 2,911,897, granted November 10, 1959). Only so much of the shutter structure which is necessary to the understanding of the present invention will be here described, since reference may be made to the patent application mentioned for a complete disclosure.

The between-lens shutter 600 is provided with a diaphragm device including the diaphragm leaves 666, only one of which is here illustrated in order to clarify the drawing. A first diaphragm setting ring 636 has arcuate control slits 668 each of which engages with a control pin 670 depending from each diaphragm leaf 666. To actuate the ring 636 to close or open all of the diaphragm leaves at the same time, an arm 672 extends radially from the ring and is fixed to an external setting ring 602. The diaphragm leaves may also be actuated by a ring 646 which engages the pivot pin 674 of each of the leaves 666. To actuate the ring 646, a radially and axially extending arm 611 is engaged with a setting ring 620. The rings 646 and 636 are coupled with each other with a lost motion connection including the slot 676 and the pin 678 as explained in the aforementioned patent application Ser. No. 539,896. The ring 620 is more specifically a shutter speed setting ring and is provided with a permanent mark or indication 612 which cooperates with a shutter speed scale 622 imprinted circumferentially on the shutter casing 610, and also with a circumferentially graduated diaphragm aperture scale 654, shown here expressed in the usual f numbers, marked circumferentially on the aperture adjusting ring 602. Spaced from the scale 654 circumferentially on the ring 602 is an exposure value scale 662, readable in conjunction with a mark 614 carried by the shutter casing or the camera body.

In accordance with the invention, the shutter speed setting ring 620 has imprinted on it a circumferentially graduated auxiliary range or distance scale 402a'', expressed in any convenient units of distance, such as meters. The setting ring 602 has an arcuate projection 602a on which are imprinted a guide number scale 400b''. As with the embodiment of FIGS. 1 and 2, the spacing and arrangement of the auxiliary distance and guide number scales are dependent on the arrangement of the shutter speed and diaphragm aperture scales, so that there is no chance of using an incorrect shutter speed.

In this modification, the guide number scale may, if desired, be covered so that only the selected value is visible through a window in the covering ring, such as is explained in regard to the modification of FIG. 3.

The invention enables the operator to avoid making any mental calculations upon adjusting the distance and the diaphragm aperture, which are the factors primarily entering into question for a flash photograph. The setting process for flash photographs is therefore made substantially automatic so that substantial freedom from error is obtained when the camera is employed by a relatively untrained operator. Since the basic setting of the secondary factors, such as film speed, guide number, and shutter speed, can be effected for an entire series of photographs, it is only necessary to change the setting of the primary factors, these being the distance and the diaphragm aperture, to effect a simple readjustment of the diaphragm adjustment member to the new value. The construction shown in FIGS. 1 to 6 with the arrangement of the indicating device on the periphery of the shutter in the direct vicinity of the shutter speed and diaphragm aperture scales and the application of the auxiliary distance scale directly on the shutter speed setting ring result in the further advantage that a transmission chain between the shutter speed setting ring and the indicating device is unnecessary. Furthermore, in this case all scales are located at a single point and can be seen at a single glance by the operator, which constitutes a further important simplification.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A shutter construction for a camera for use in flash photography comprising a between-lens shutter mounted on the optical axis of the camera, a diaphragm aperture setting ring mounted for rotary movement about the optical axis, a shutter speed setting ring mounted for rotary movement about the optical axis, differential gear means for coupling the movement of said two rings, control ring means for actuating the movement of said gear means and rings, shutter speed and diaphragm aperture scale means for indicating the position of said seting rings, an auxiliary distance scale carried by said shutter speed setting ring, a scale ring mounted for rotary movement about the optical axis, gear means for coupling said scale ring to said control ring means for rotation in the same direction as said diaphragm aperture setting ring, and a guide number scale carried by said scale ring for cooperating with said auxiliary distance scale to position said diaphragm aperture ring for flash photographs.

2. A construction as defined in claim 1, including a covering ring adjustably secured to said scale ring for masking the unselected values of said guide number scale, said covering ring having a window through which the selected guide number appears.

3. In a photographic camera of the type having a rotatable shutter speed adjusting ring, a rotatable diaphragm aperture adjusting ring, and differential gearing operatively connecting said rings to each other, the differential gearing including a rotatable control ring carrying a planet gear simultaneously engaged with gear teeth on said speed adjusting ring and gear teeth on said aperture adjusting ring, the improvement which comprises a distance scale marked circumferentially on said speed adjusting ring to indicate distance from a source of flash a principal object being photographed when using the camera to take a flashlight photograph, a rotatable flash guide ring carrying a circumferentially graduated flash guide number scale and a reference point associated with said flash guide number scale and turning with said guide ring to move past said distance scale in readable relation thereto, and gearing operatively connecting said guide ring to said control ring to turn therewith but at a different rate.

4. A construction as defined in claim 3, in which said guide ring turns in the same direction as said control ring and at twice the speed thereof, and in which said differential gearing causes said aperture adjusting ring to turn in the same direction as said control ring and at twice the speed thereof when said control ring is rotated while said shutter speed adjusting ring remains stationary, so that upon such turning of said control ring said aperture adjusting ring and said guide ring will both be turned in the same direction to the same extent and said reference point will move along said distance scale.

References Cited in the file of this patent

UNITED STATES PATENTS

| | | |
|---|---|---|
| 2,213,749 | Strauss | Sept. 3, 1940 |
| 2,334,075 | Davenport | Nov. 9, 1943 |
| 2,464,559 | Davenport et al. | Mar. 15, 1949 |
| 2,517,590 | Mundorff | Aug. 8, 1950 |
| 2,612,091 | Weiss | Sept. 30, 1952 |
| 2,671,614 | Schwartz et al. | Mar. 9, 1954 |

OTHER REFERENCES

The Camera Magazine, vol. 74, issue No. 9, September 1951 (pages 108–109 and 114 cited).